United States Patent [19]

Shen

[11] 4,402,926

[45] Sep. 6, 1983

[54] PROCESS FOR PRODUCING CHLORINATED TRISODIUM PHOSPHATE

[75] Inventor: Chung Y. Shen, St. Louis, Mo.

[73] Assignee: Monsanto Company, St. Louis, Mo.

[21] Appl. No.: 306,104

[22] Filed: Sep. 28, 1981

[51] Int. Cl.³ ............................................. C01B 25/16
[52] U.S. Cl. ...................................... 423/300; 252/99
[58] Field of Search ........................................ 423/300

[56] References Cited

U.S. PATENT DOCUMENTS

| | | | |
|---|---|---|---|
| 1,555,474 | 9/1925 | Mathias . | |
| 1,965,304 | 7/1934 | Adler | 23/250 |
| 3,342,737 | 9/1967 | Taylor | 252/99 |
| 3,364,147 | 1/1968 | Stamm | 252/99 |
| 3,525,583 | 8/1970 | Vickers | 23/50 |
| 3,656,890 | 4/1972 | Toy et al. | 23/50 R |

FOREIGN PATENT DOCUMENTS

| | | | |
|---|---|---|---|
| 1282007 | 11/1968 | Fed. Rep. of Germany | 423/300 |
| 517561 | 6/1976 | U.S.S.R. | 423/300 |

OTHER PUBLICATIONS

Kirk-Othmer, *Encyclopedia of Chemical Technology*, Second Edition, vol. 6, Interscience Publishers (1965), pp. 502, 503.

*Primary Examiner*—O. R. Vertiz
*Assistant Examiner*—Wayne A. Langel
*Attorney, Agent, or Firm*—Jon H. Beusen; James C. Logomasini; Arnold H. Cole

[57] ABSTRACT

A process is disclosed for producing chlorinated trisodium phosphate, comprising:

(a) producing a hot sodium phosphate liquor, preferably with an overall Na/P mole ratio from 2.60 to 2.85;

(b) adding sodium hypochlorite solution, preferably with an available chlorine content greater than 14%;

(c) mixing the components, preferably from 70° C. to 80° C., only long enough to form a true solution;

(d) cooling the melt by evaporative cooling under reduced pressure to form crystalline chlorinated trisodium phosphate;

(e) air drying the product, if necessary, below about 40° C.

5 Claims, No Drawings

PROCESS FOR PRODUCING CHLORINATED TRISODIUM PHOSPHATE

BACKGROUND OF THE INVENTION

1. Field of the Invention

This invention relates to an improved process for production of chlorinated trisodium phosphate. This process produces a product with a higher chlorine recovery efficiency and more stable chlorine content than prior art process.

2. Background Discussion

Chlorinated trisodium phosphate is used as a source of available chlorine for cleaning, bleaching, and sterilization. It is used as a component in cleansers, automatic dishwashing compositions, and similar applications and in pure form as a sterilizing agent in food processing plants, dairies, breweries, and the like.

The name "chlorinated trisodium phosphate" is actually a misnomer. It is currently believed to be a crystalline material consisting of $Na_3PO_4$, $Na_2HPO_4$, $NaOCl$, $NaCl$, and $H_2O$. The available chlorine is supplied by equal moles of $NaOCl$ and $NaCl$. The name chlorinated trisodium phosphate remains for historical reasons and for the sake of simplicity is used herein.

Chlorinated trisodium phosphate is produced by adding a sodium hypochlorite solution to a hot sodium phosphate liquor, cooling the resulting mixture to produce crystals of the product either by crystallization from an aqueous solution or from a molten mass of chlorinated trisodium phosphate, and drying the crystals. During the course of this process, some of the chlorine added by the sodium hypochlorite solution may be lost. Additionally, some of the chlorine present in the final product does not react to produce available chlorine. The available chlorine that can be obtained from the chlorinated trisodium phosphate compared to the amount of chlorine present as hypochlorite and chloride, expressed in terms of percents, is called the chlorine recovery efficiency. The chlorine recovery efficiency in prior art processes is in the range of 75% to 80%. The chlorine recovery efficiency can be enhanced somewhat by use of additives, such as by the addition of a water soluble silicate to the mixture, see U.S. Pat. No. 3,656,890, Toy, et al.

It is an advantage of this invention that chlorinated trisodium phosphate is produced that has an increased percentage of available chlorine, an increased chlorine recovery efficiency, and more stable available chlorine, all without the use of additives. Further advantages will become apparent from the following description and examples.

SUMMARY OF THE INVENTION

This invention is a process for the production of chlorinated trisodium phosphate, comprising:

(a) producing a hot sodium phosphate liquor;

(b) adding sodium hypochlorite solution, preferably containing at least 14 percent available chlorine;

(c) mixing the components from about 70° C. to about 80° C. only long enough to form a true solution, resulting in a chlorinated trisodium phosphate melt;

(d) cooling the melt evaporatively under reduced pressure to form crystalline chlorinated trisodium phosphate; and (e) air drying the product, if necessary at or below about 40° C.

DESCRIPTION OF THE PREFERRED EMBODIMENTS

The first step in this preparation is to produce a hot phosphate liquor. This can be done in a number of ways, such as by neutralization of a phosphoric acid solution with sodium hydroxide, by mixing disodium phosphate with trisodium phosphate containing a desired level of water and heating to form a melt, or by any other method that will produce a liquor with Na/P mole ratio in the range of 2 to 3. The temperature of the phosphate liquor must be sufficiently high to produce a complete solution of the components. For best results, the liquor should have a Na/P mole ratio of 2.60–2.85, with $Na_2O$ present at about 26.0% to about 28.0% by weight of the liquor at 90° C. to 100° C. It is important that the phosphate liquor be a true solution. The existence of undissolved solids reduces the chlorine recovery efficiency.

The second step is the addition of a sodium hypochlorite solution to the phosphate liquor. For best results, the sodium hypochlorite solution should contain about 14% to 16% active chlorine, with free sodium hydroxide of about 2% to about 4% by weight of the hypochlorite solution. The hypochlorite solution is added in an amount sufficient to give the desired total chlorine content, preferably about 4.25% to about 5.0% by weight of the mixture. Temperatures of the phosphate liquor and the hypochlorite solution prior to addition of the hypochlorite solution should be such that the resulting mixture is from about 70° C. to about 80° C. The temperature of the mixture should be above the range over which the chlorinated trisodium phosphate melts, 65° C. to 70° C., and below a temperature above which chlorine loss from the melt becomes significant, about 80° C.

Following the addition of the hypochlorite solution, the mixture is mixed vigorously only long enough to form a complete solution of the components, usually no longer than 1–5 minutes, while maintaining a temperature of 70° C. to 80° C.

The mixture is then evaporatively cooled, under reduced pressure, with continued mixing, to form fine, crystalline chlorinated trisodium phosphate. Evaporative cooling occurs when the pressure within the cooling vessel is below the vapor pressure of water above the solution. A lower absolute pressure within the cooling vessel means that evaporative cooling will be more effective. Evaporative cooling is best accomplished at an absolute pressure below about 180 torr. Crystallization is complete in the range of 60° C. to 65° C., but evaporative cooling can be continued until a temperature low enough for further processing and packaging is reached. If necessary, the crystals may be further dried under an air stream below about 40° C., without significant loss of active chlorine. The water content of the final product should be in the range of 51% to 53% by weight. Surprisingly, use of evaporative cooling under reduced pressure results in a product that is superior to that produced by other rapid cooling procedures, as is discussed further below.

This process produces essentially uniform, small crystals, eliminating the need for further processing to reduce crystal size. The small, uniform crystals are resistant to caking. The chlorinated trisodium phosphate produced by this process has a chlorine recovery efficiency exceeding 80%. This process can be conducted as either a batch or continuous process.

The following examples will further describe the process of this invention. These examples are used for illustrative purposes only and are not to be construed in a limiting sense. Unless noted otherwise, all percentages are by weight. The available chlorine was determined by titration with sodium sulfite.

EXAMPLE 1

A sample of chlorinated trisodium phosphate was prepared according to the procedure described in the first example of U.S. Pat. No. 1,965,304 except in a smaller size batch. The specification of U.S. Pat. No. 1,965,304 is incorporated by reference. Briefly outlined, the procedure used was as follows. A melt was prepared using partially hydrated disodium phosphate and caustic soda, to give an apparent density of 56.5° Baume at 105° C. A sodium hypochlorite solution containing 14.5% available chlorine was added to the phosphate liquor to produce a melt at 90° C. The mixture was agitated at ambient pressure until cooled to 35° C. Cooling was accomplished by circulating room temperature water through a cooling jacket surrounding the vessel. Analysis of the damp product showed 3.62% active chlorine, and a chlorine recovery efficiency of about 99%. The damp material was air dried for about 60 minutes. The dried material contained 2.89% available chlorine, with a chlorine recovery efficiency of about 79%. This is in close agreement with Example 4 (Table I) of U.S. Pat. No. 3,656,890, which uses a similar process as a prior art process, with a resulting chlorine recovery efficiency of about 78%. U.S. Pat. No. 3,656,890 showed that an additive, a water soluble silicate, can increase the chlorine recovery efficiency to about 83%, although the presence of the silicate results in a slightly turbid solution.

EXAMPLE 2

A hot phosphate liquor was produced using 48.01 grams of 50% NaOH solution and 26.05 grams of 85% solution of $H_3PO_4$. The exothermic neutralization reaction raised the temperature of the mixture to 110° C., and 6.09 grams of water was lost to evaporation. The resulting 110° C. solution contained about 27% $NaO_2$ with Na/P mole ratio of about 2.60. To the hot phosphate liquor, 31.03 grams of a 25° C. solution of sodium hypochlorite containing 14.5% available chlorine and 3% free NaOH, was added with mixing. The resulting solution was a clear, true solution at about 87° C. At this temperature, the amount of available chlorine decreased at a rate of about 0.5% per minute.

EXAMPLE 3

A hot phosphate liquor was produced using the procedure of Example 2 except that the phosphate solution was cooled to 90° C. before the addition of the sodium hypochlorite solution. The resulting solution was again a clear true solution, but the temperature was 71° C. After 5 minutes of mixing at 71° C., this solution showed no detectable loss of available chlorine.

Comparison of the results of Example 3 with Example 2 demonstrates the need to maintain the chlorinated trisodium phosphate melt at a carefully controlled temperature to avoid loss of chlorine at this step. It has been found that mixing this chlorinated trisodium phosphate at a temperature in excess of 80° C. results in unacceptable loss of chlorine.

EXAMPLE 4

A chlorinated trisodium phosphate melt prepared according to the procedure used in Example 3 was evaporatively cooled under reduced pressure, producing a damp crystalline product. Absolute pressure was below about 100 torr. Analysis showed this damp crystalline product to contain 4.15% available chlorine. After drying for 27 hours at 70° F. (21° C.) and 50% relative humidity, analysis showed the dried material to have 4.15% available chlorine with a chlorine recovery efficiency of 92%.

EXAMPLE 5

Chlorinated trisodium phosphate was prepared according to the procedure in Example 4 except that the phosphate liquor was cooled to 80° C. before adding the hypochlorite. This resulted in a chlorinated trisodium phosphate melt at 64° C. Analysis of the product prior to drying showed 4.17% available chlorine. Analysis after drying showed about 4.04% available chlorine, and a chlorine recovery efficiency of 90%.

EXAMPLE 6

Chlorinated trisodium phosphate was prepared according to Example 4, except that the sodium hypochlorite solution contained 13.5% available chlorine. Prior to the drying, product analysis showed 3.68% available chlorine. After drying, the product contained 3.44% available chlorine, with a chlorine recovery efficiency of 76%.

EXAMPLE 7

Chlorinated trisodium phosphate was prepared according to the procedure of Example 5, except that the sodium hypochlorite used had 13.5% available chlorine. Prior to drying, analysis of the product showed 3.53% available chlorine. The dried product had 3.53% available chlorine and a chlorine recovery efficiency of 78.4%.

The results of Examples 4-7 are shown in Table I.

TABLE I

| Example Number | % Chlorine in Hypochlorite | Temp. of Product Melt | Available Chlorine | | Chlorine Recovery Efficiency |
|---|---|---|---|---|---|
| | | | Before Drying | After Drying | |
| 4 | 14.5% | 71° C. | 4.15% | 4.15% | 92.2% |
| 5 | 14.5% | 64° C. | 4.17% | 4.04% | 89.8% |
| 6 | 13.5% | 71° C. | 3.68% | 3.44% | 76.4% |
| 7 | 13.5% | 64° C. | 3.58% | 3.53% | 78.4% |

Comparison of Examples 4 and 5 with Example 1 shows that addition of the step of evaporative cooling under reduced pressure dramatically increases the chlorine recovery efficiency. Additionally, the damp product produced by vacuum cooling is a fine, crystalline substance which requires only additional drying prior to packaging, as opposed to the glassy, vitreous material produced by other rapid cooling procedures, which requires costly milling or flaking in addition to final drying.

Comparison of Examples 4 and 5 with Examples 6 and 7 shows that chlorine recovery efficiency is enhanced by the use of a stronger hypochlorite solution. It has been found that use of a sodium hypochlorite solution with greater than about 14% available chlorine produces improved results.

The lower extreme of the temperature range at which the melt is mixed prior to cooling has also been found to be important. Determination of an exact temperature to be considered the lower end of this range and the degree of deterioration in product quality that occurs as the mixing temperature is reduced beyond the acceptable range have been difficult to determine accurately. It has generally been observed that mixing at temperatures below 70° C. increased the likelihood that chlorine stability of the product will be reduced and that available chlorine will be lost in drying. The reason for this decreased stability is not entirely clear, and it has not occurred consistently. This can be seen by comparing the reduction of available chlorine in Example 4 with Example 5 and in Example 6 and 7.

EXAMPLE 8

Chlorinated trisodium phosphate produced in Examples 4–7 was dried in air streams of different temperatures, and available chlorine was determined at various intervals. The data are summarized in Table II.

TABLE II

| Drying Temp.* & Time | Example 4 Avail. Cl. | Example 4 % Loss | Example 5 Avail. Cl. | Example 5 % Loss | Example 6 Avail. Cl. | Example 6 % Loss | Example 7 Avail. Cl. | Example 7 % Loss |
|---|---|---|---|---|---|---|---|---|
| 30° C. | | | | | | | | |
| 15 min. | 4.16% | 0.0% | 4.17% | 0.0% | 3.69% | 0.0% | 3.57% | 0.0% |
| 30 min. | 4.15% | 0.0% | 4.17% | 0.0% | 3.66% | 0.5% | 3.53% | 1.2% |
| 60 min. | 4.10% | 1.2% | 4.11% | 1.4% | 3.60% | 2.0% | 3.48% | 2.7% |
| 35° C. | | | | | | | | |
| 15 min. | 4.16% | 0.0% | 4.17% | 0.0% | 3.65% | 0.6% | 3.55% | 0.7% |
| 30 min. | 4.12% | 0.8% | 4.13% | 0.9% | 3.63% | 1.4% | 3.52% | 1.6% |
| 60 min. | 4.03% | 2.8% | 4.06% | 2.6% | 3.47% | 5.6% | 3.39% | 5.4% |
| 40° C. | | | | | | | | |
| 15 min. | 4.12% | 0.7% | 4.14% | 0.6% | 3.65% | 0.7% | 3.55% | 0.8% |
| 30 min. | 4.08% | 1.7% | 4.09% | 1.8% | 3.58% | 2.8% | 3.48% | 2.9% |
| 60 min. | 3.97% | 4.4% | 3.98% | 4.5% | 3.33% | 9.5% | 3.27% | 8.6% |
| 50° C. | | | | | | | | |
| 15 min. | 4.10% | 1.2% | 4.13% | 1.0% | 3.56% | 3.1% | 3.45% | 3.5% |
| 30 min. | 3.97% | 4.4% | 3.99% | 4.4% | 3.44% | 6.4% | 3.34% | 6.8% |
| 60 min. | 3.80% | 8.4% | 3.84% | 7.9% | 3.29% | 10.5% | 3.19% | 11.8% |

*Temperatures are ± 0.5° C. of temperature given.

Comparison of the data in Table II for Examples 4 and 5 with Examples 6 and 7 shows that use of the stronger hypochlorite solution (14.5%) produces a more stable product than is produced using the weaker hypochlorite solution (13.5%).

Table II also shows that chlorine loss is increased as drying temperature increases. Above about 40° C. the increased drying speed obtained by using higher drying temperatures is offset by the increased loss of chlorine, making drying temperatures in excess of 40° C. undesirable.

The process of this invention, for reasons that are not fully understood, surprisingly results in more stable chlorine content, and a higher chlorine recovery efficiency.

The preceding examples are meant to illustrate and explain this invention, and are not meant to, in any way, limit the invention.

I claim:

1. A process for producing chlorinated trisodium phosphate, comprising:
 (a) producing a hot sodium phosphate liquor having an overall Na/P mole ratio from about 2 to about 3 at a temperature sufficient to produce a complete solution of the components;
 (b) adding sodium hypochlorite solution;
 (c) mixing the components to form a chlorinated trisodium phosphate melt; and
 (d) cooling the chlorinated trisodium phosphate melt by evaporative cooling under reduced pressure with continued mixing without allowing the water content to be reduced to less than 51 percent by weight which results in formation of crystalline chlorinated trisodium phosphate.

2. The process of claim 1, wherein the hot sodium phosphate liquor in step (a) has an overall Na/P mole ratio from about 2.60 to about 2.85, with $Na_2O$ present from about 26.0 percent by weight to about 28.0 percent by weight.

3. The process of claim 1 or 2, wherein the temperatures of the hot sodium phosphate liquor in step (a) and the sodium hypochlorite solution in step (b) are such that the mixing in step (c) occurs from about 70° C. to about 80° C., only long enough to form a complete solution.

4. The process of claim 1 or 2, wherein the sodium hypochlorite solution added in step (b) has an available chlorine content equal to or greater than 14 percent by weight.

5. The process of claim 1 or 2, further comprising air drying the crystalline chlorinated trisodium phosphate formed in step (d) at or below 40° C., to between 53 percent and 51 percent water content by weight.

* * * * *